United States Patent

Federman

[15] 3,669,179

[45] June 13, 1972

[54] PROCESS OF BONDING MOLTEN METAL TO PREFORM WITHOUT INTERFACIAL ALLOY FORMATION

[72] Inventor: Alfred P. Federman, 9744 Sherman Road, Chesterland, Ohio 44026

[22] Filed: March 5, 1969

[21] Appl. No.: 804,641

[52] U.S. Cl. ..............................164/66, 164/86, 164/103
[51] Int. Cl. ................B22d 11/04, B22d 19/00, B22d 25/06
[58] Field of Search.....................164/86, 275, 98, 103, 105, 164/66

[56] References Cited

UNITED STATES PATENTS 3,470,939   10/1969   Coad...................................164/86 X

*Primary Examiner*—Robert D. Baldwin
*Attorney*—Isler and Ornstein

[57] ABSTRACT

A unitary composite metal article formed of two dissimilar metals and the process for making the same by heating a substrate metal to a bonding temperature which is below the melting point of both the substrate and the casting metal; bringing the heated substrate and the molten casting metal into contact in an article-forming mold in the absence of an oxidizing atmosphere until wetting and molecular adhesion at the interface has been attained; and establishing a rate of heat transfer between the molten casting metal and the solid substrate which will cause chilling and solidification of the casting metal at the interface before formation of an interfacial alloy can occur. The resulting composite article represents a molecular bond of the casting metal to the substrate at the interface and is free from any visible interfacial alloy stratum.

4 Claims, 4 Drawing Figures

INVENTOR.
ALFRED P. FEDERMAN
BY
Isler & Ornstein
ATTORNEYS.

PROCESS OF BONDING MOLTEN METAL TO PREFORM WITHOUT INTERFACIAL ALLOY FORMATION

BACKGROUND OF THE INVENTION

The invention relates to the non-fusion bonding of a molten casting metal and a solid state substrate at bonding temperatures below the melting points of either of the joined metals.

The joinder of similar or dissimilar metals by welding or by brazing or by soldering or similar means involving the application of heat to the metals is well known to the prior art. These joinder techniques are generally employed to join discrete preformed elements into a desired structural assembly or relationship and most often involve the use of a bonding metal which is dissimilar to either of the metals to be joined as a bonding bridge between the elements to be joined.

In fusion welding, both of the metal elements to be joined as well as the weld metal or filler metal are heated to a molten state to effect the joinder. In brazing and in soldering it is necessary that the metals to be joined be heated to at least the melting point of the braze metal or solder which is being utilized. When metals are joined by fusion, the crystalline structure and composition of the metal in the joinder area is subject to radical changes which are often undesirable in the finished product or may even be severe enough to preclude the use of this technique in particular instances. Brazing and soldering techniques not only introduce a bridging alloy between the metals to be joined, but also provide a joint or bond which is inferior in strength, malleability, impact resistance, or some other desired characteristic which is sought and obtained in one or both of the metals to be joined.

In the field of composite metal products or articles formed by casting, securement of the cast metal to the base metal or substrate may result from a fusion process, but most often is mechanical in nature such as results from contraction shrinkage of a casting metal around a solid substrate or as is provided by notches or undercuts or similar interlocking surface projections on the substrate into which the casting metal can flow and solidify. However, in the latter instance, although the securement may be quite satisfactory, it does involve an additional expense in creating the necessary interlock surfaces on the substrate as well as resulting in weakened sections of the solidified casting metal. The frictional securement by contraction shrinkage of the casting metal is ordinarily far less reliable than the mechanical interlock and is, by nature of the thermal characteristics required, extremely limited in the combinations that can be effected.

There is still another form of composite metal casting which, for convenience in description, may be referred to as immersion casting. In immersion casting, there are two known forms, both of which differ from the invention disclosed herein, in that the known forms expose the substrate directly to a reservoir of molten casting metal whose volume is always maintained substantially in excess of the volume of metal being deposited on the substrate. Thus, in both of these known techniques, there is a complete or partial immersion of the substrate in or to a reservoir of casting metal in order to expose the substrate directly to the total mass of molten casting metal of the reservoir.

In one of these techniques, the substrate in the form of a wire of small diameter is immersed in and traverses the molten bath of casting metal with a resultant chilling of the casting metal and its adherence to the surface of the substrate. No article forming mold or cavity is utilized. The thickness of the deposited casting metal is determined by the temperature differential between the substrate and the molten casting metal and the speed at which the substrate traverses the molten bath. Continuous casting by this technique can be accomplished only on thin, flexible composite articles, such as wire of small diameter, as it is necessary for the substrate to be bent or coiled both before and during the coating process in order to permit it to have entrance and exit from below the surface of the molten bath in which it is immersed. Furthermore, there is an equilibrium attained in this process when the substrate is exposed for too long a period to the heat of the molten bath in which it is immersed, at which point the deposited and chilled casting metal commences to remelt and return to the bath. For this reason, it is not possible to use this technique for the production of composite articles in which the deposited casting metal is required to be greater than 30 percent of the total diameter or thickness of the resultant composite product. This limitation on the thickness of coating applies even to relatively thin or flexible articles such as small diameter wire heretofore referred to. Thus, for the production of continuously cast composite articles which are not amenable to being coiled in the manner required by this technique or require relatively heavy coatings, this known technique will not serve.

The second known form of continuous casting technique utilizes a head or hydrostatic pressure head of a reservoir of molten casting metal and passes a flat or planar substrate below the molten bath of material in a manner so that one side of the substrate is exposed directly to the molten bath. By utilizing confining means equivalent to a leveling bar or a doctor blade, a wiping action is achieved which establishes the volume or thickness of the molten coating metal which is carried and chilled by the exposed surface of the flat substrate as it passes under the open reservoir. This technique requires that the substrate move only in a horizontal plane so that the confined pool of casting metal can be retained and will not run off the surface of the substrate prior to complete chilling of the coating. It will be evident that this known technique is only capable of depositing the cast metal on one planar surface of a substrate and is incapable of producing a composite article in which a substrate core is completely enveloped by a coating of casting metal. For this reason, this known technique is utilized only for the coating of one side of a sheet or strip of substrate metal.

Neither of these known techniques permit any variation or flexibility in the form or configuration of the cross-section of the deposited casting metal.

There are particular types of manufactured articles, such as for example gears or sleeve bearings, which may have relatively large mass but whose operating or functional area is limited to the periphery or surface of the article. A bronze metal worm gear, for example, may require ten pounds of bronze in cast form or in bar form. However, it is only the peripheral margin of the gear in which the teeth are formed that requires the characteristics of the bronze for its function; the remainder of the gear need not necessarily be of bronze but could well be of a metal such as steel which is unsatisfactory for the teeth of the gear but is quite adequate for the body of the gear. Similarly, the functional friction-reducing surface of a sleeve bearing actually requires a relatively small mass of bearing metal in relation to the total mass of such bearing metal which is customarily utilized in the manufacture of the sleeve bearing.

It is evident that composite metal articles made of two dissimilar metals could substantially reduce the cost of such articles which are now manufactured wholly from the more expensive metal which has the desired or needed characteristics required only in a peripheral portion of the article. However, apart from the economy which can be effected in reduced metal costs, there must also be taken into consideration the off-setting increased cost of manufacture of a satisfactory composite metal article which may outweigh the economic benefit obtained from reduced metal cost. Of equal importance, the composite metal article must have the structural reliability to meet the performance requirements of the unimetal article which it replaces and must not introduce undesirable characteristics into the composite product resulting from the bonding or joining process, which might interfere with subsequent processing of the article or increase the probability of premature failure.

SUMMARY OF THE INVENTION

The invention contemplates a composite metal product or article of at least two dissimilar metals, each of which may be ferrous or non-ferrous, although the majority of the applications of the invention will ordinarily involve the use of a solid substrate of ferrous metal, such as low carbon steel, onto which is cast a molten non-ferrous metal. Such an article could for example be a gear blank, such as described above, having a steel body and a peripheral cast ring of bronze. The solid substrate, in this instance the steel core of the gear, is heated in a non-oxidizing atmosphere to a preheat temperature which is below the melting point of the solid substrate, as well as being below the melting point of the casting metal. The preheated substrate is disposed in the article-forming cavity of a suitable mold which is free of oxidizing atmosphere, and the molten casting metal is flowed into the cavity and around the exposed portions of the substrate so as to form either a unit article of the desired shape and form or to form a continuous cast article of uniform cross-section which can subsequently be divided or separated into unit articles.

Inasmuch as the molten casting metal is at a higher temperature than the substrate, a heat transfer relationship is established in the mold between the substrate and the molten metal which will cause the temperature at the surface of the substrate to be elevated with corresponding chilling of the casting metal at the interface. The result desired is a molecular adhesion of the dissimilar metals at the interface without any significant interfacial alloy formation. This is achieved by regulating or controlling the preheat temperature of the substrate and the temperature of the molten casting metal so as to establish a rate of heat transfer which is sufficient to maintain a bonding temperature at the interface until the molecular adhesion is completed between the molten metal and the substrate, but which will also chill the molten metal at the interface sufficiently to cause solidification thereof after the bond has been achieved but before significant alloy formation takes place at the interface. After solidification, the composite cast article is removed or discharged from the mold. The resulting composite metal article is free from any visible stratum of interface alloy at magnifications of 100× and provides a molecular adhesion bond with no embrittlement and with characteristics of strength and impact resistance which are at least equal to and in most cases superior to those attained in the mechanical joinder arrangements previously described for composite cast articles.

DESCRIPTION

Figure 1:
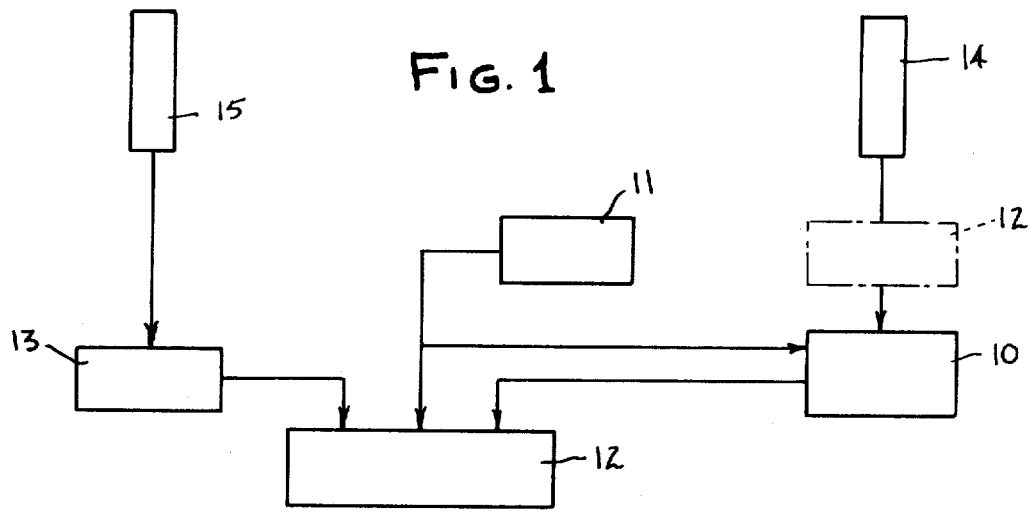
FIG. 1 of the drawings is a schematic flow diagram illustrating the steps of the process.

FIG. 1 is a diagrammatic representation of the bonding and article-forming process. A bondable metal substrate is heated to a selected preheat temperature in an appropriate preheat oven or furnace 10 in a non-oxidizing atmosphere supplied from a source 11. The atmosphere may be a reducing atmosphere or an inert atmosphere which has the function of reducing or preventing oxidation of the surface of the substrate metal during the heating step and, as will hereinafter appear, during the casting step as well.

The substrate metal can be ferrous or non-ferrous and may have a melting point which is either higher or lower than that of the casting metal. It can be a substantially pure metal or a metal alloy, both of which I intend to include within the term "metal". In those instances where the article to be formed will have a uniform cross-section, the substrate will ordinarily be in the form of a length of rod or bar of rolled, drawn or extruded metal, which length may be that of the article to be cast in those instances where the casting will be that of a single article, or which length may be indeterminate or continuous in those instances where a continuous form of casting is being employed. For articles of non-uniform cross-section, the substrate may be a premachined or preformed or precast piece of the desired configuration.

When the selected preheat temperature of the substrate has been attained, the substrate is disposed in the cavity of an article forming mold 12 which has been purged of oxidizing atmosphere by an inert or reducing gas which may be the same as that used during the heating of the substrate or may be different. As indicated by the dotted outline in FIG. 1, instead of transferring the preheated substrate to the mold 12, there may be circumstances where it is desirable that the substrate be disposed in the mold 12 during the step of preheating so that subsequent transfer is not required. Either of these arrangements or sequences of operation is contemplated to be within the scope of the process and it is essentially immaterial to the scope of the process whether the substrate be preheated in the article forming mold or be preheated separately therefrom and transferred thereto while maintaining the substrate free from exposure to oxidizing influences. A bondable casting metal, which is maintained in a liquid or molten state in a suitable melting pot or holding vessel 13 is flowed into the cavity of the mold 12 and flows around that surface portion of the substrate which is exposed therein. The casting metal may be ferrous or non-ferrous and may have a melting point which is either higher or lower than that of the substrate. The term "bondable metal or metals" as used herein is intended to define dissimilar metals (including substantially pure metals or metal alloys) which, when one of such dissimilar metals is in the molten state, effect a wetting and molecular bonding of the solid substrate at a bonding temperature which is lower than the melting point or temperature of either of the two bondable metals.

The term "melting point or melting temperature" as used herein denotes the temperature at which the metal commences to melt and, in the case of alloys, is equivalent to the solidus temperature. The term "bonding temperature" as used herein, denotes a temperature at the interface of a bondable molten metal and a bondable solid state dissimilar metal, at which energy values or adhesion characteristics are attained which create a wetting and bonding condition in the area of contact between the metals. As should be evident from the preceding description, the term "substrate" as used herein denotes a bondable metal in the solid state at the time that the bond is achieved. The term "casting metal" denotes a bondable metal in the liquid or molten state at the time that bond is achieved with the substrate at the interface. The term "interface" as used herein, denotes the boundary or area of contact between the substrate and the casting metal.

For any given combination of bondable metals, the bonding temperature will fall within a fairly broad range and must be considered in the light of various variable factors. Inasmuch as the primary object of the invention is to achieve an effective molecular bond without the formation of an interface alloy, the bonding temperature must be controlled to prevent melting or fusion of the substrate at the interface with consequent interfacial alloy formation. Even where the bonding temperature is maintained below the melting point of the substrate, the combination of molten casting metal and solid substrate may have such solubility or adsorption characteristics at such elevated temperature as to induce the formation of a significant and undesirable stratum of interface alloy. Therefore, it is desirable to utilize that portion of the bonding temperature range which would lie below the temperature at which such undesirable alloy formation is encouraged. Alternatively, it has been found that the minimum bonding temperature at which molecular bond can be achieved is a temperature at which the formation of an interface alloy is induced, but at a relatively slow rate compared to the time required to complete the wetting and bonding action at the interface at that bonding temperature. By curtailing the duration of time during which the bonding temperature is maintained to a bonding time which is less than sufficient to permit any significant interface alloy formation, it is possible to achieve the desired alloy-free bond at the interface.

The term "alloying temperature" as used herein denotes a temperature at which an interface alloy is formed when such temperature is maintained for a time interval equal to or less than the bonding time, and which is visually apparent on metallographically polished specimens at magnifications of 100x. The term "bonding time" as used herein denotes the time interval required for the wetting and bonding action to go to completion at the interface at a bonding temperature. Therefore, from what has been said above, in order to achieve the alloy-free interface at the bond, it is necessary that the bonding temperature be below the alloying temperature; but inasmuch as the alloying temperature has been defined as a temperature-time condition, it is evident that the bonding temperature may per se be higher than the temperature at which alloy formation can occur, provided that the bonding time is of shorter duration than that required by the defined alloying temperature.

With the foregoing considerations in mind, and giving consideration to the heat capacity or specific heat of each of the metals to be bonded, as well as the latent heat or heat of transformation which is liberated by the molten casting metal in its change from the liquid to the solid phase, a preheat temperature can be selected for the substrate and a temperature can be selected for the molten casting metal which, when the metals are brought together in the mold, will produce a bonding temperature which is maintained for a time sufficient to permit completion of the bond, but which will be curtailed before the alloying temperature condition is attained. The relative masses of substrate and casting metal involved in the article to be formed will also have some bearing in the empirical consideration and selection of the temperatures of the substrate and casting metal which are to be utilized. Giving consideration to all these variable factors, preheat and casting metal temperatures can be selected which, at the time the metals are brought into contact with each other, will elevate the substrate interface to a temperature within the bonding temperature range and will establish a rate of heat transfer at the interface sufficient to maintain the temperature within the bonding temperature range until the wetting and bonding action is completed. However, where the requisite bonding temperature is a temperature at which interface alloy formation would be induced, the selected heat transfer relationship between the metals must also be one which will not unduly prolong the maintenance of the bonding conditions beyond the necessary duration of the bonding time. Under these conditions, the rate of heat transfer established by the selected temperatures should result in chilling and solidification of the casting metal at the interface after the bond has been achieved and before significant interface alloy formation can get under way.

Although the conditions of bonding time and rate of alloy formation will vary for various combinations of metals used in the composite metal article, in general bonding time will be on the order of less than one-half second in contrast to longer time intervals required for significant interface alloy formation at the bonding temperature. Thus, the selection and establishment of temperatures and a heat transfer relationship which will cause rapid, but not premature, chilling and solidification of the casting metal at the interface, will serve to prevent formation of the interface alloy. With the proper selection and regulation of the temperatures involved, excellent alloy-free bonds are consistently attainable without great difficulty. There may be instances where external artificial cooling or heating of the mold and/or cast article is desirable or necessary for either accelerating the solidification of the casting metal or more precisely controlling the rate of heat transfer, but generally the heat transfer and heat equilibrium conditions can be attained in an environment of ambient temperature for the mold.

Figure 2:
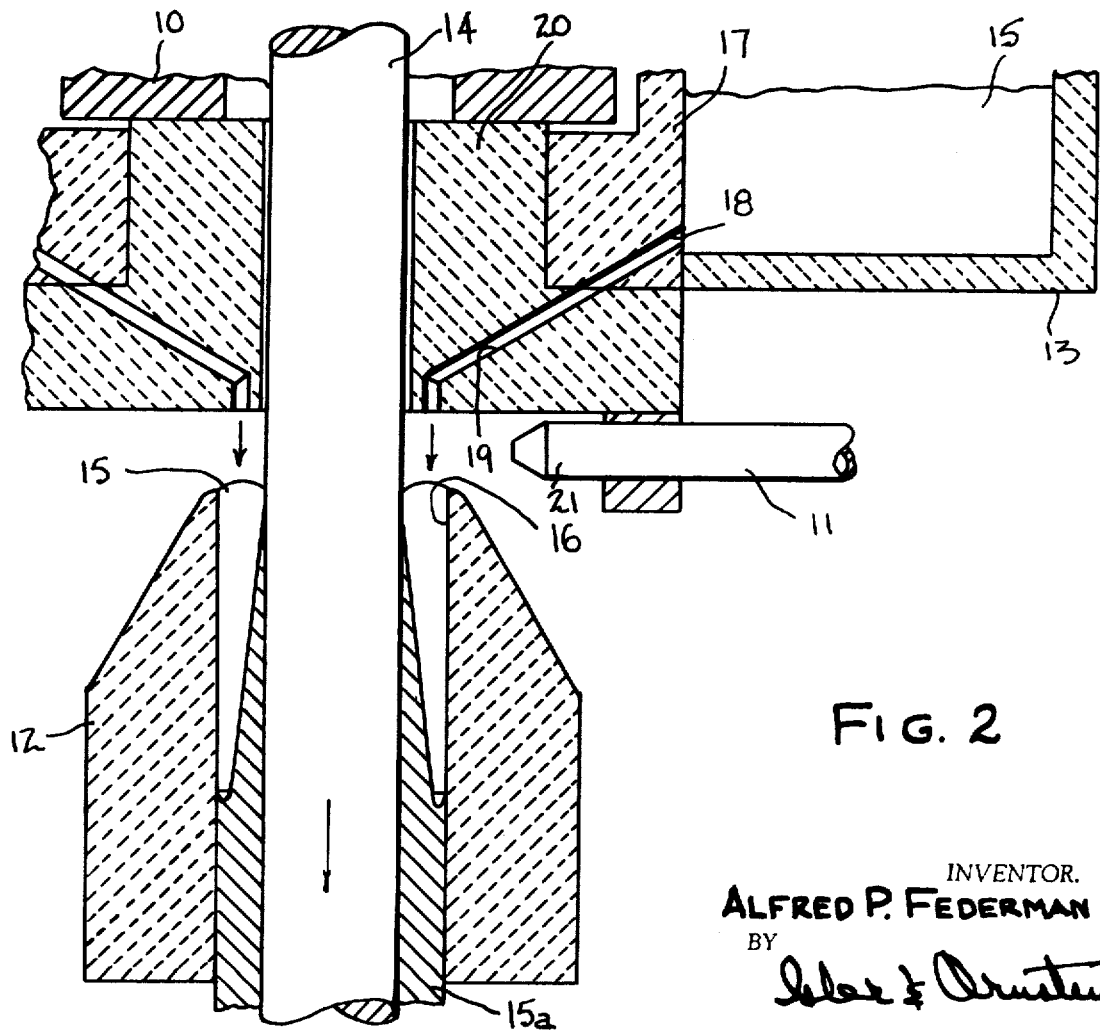
FIG. 2 is a fragmentary cross-section of a representative form of apparatus for continuous casting of a composite metal article made in accordance with the process of the invention.

The mold 12 and associated apparatus for the process may be designed for individual or unit article casting, for multiple article casting, or for semi-continuous or continuous casting, depending upon the nature and configuration of the composite article and the production requirements. FIG. 2 of the drawings illustrates a representative form of casting apparatus which could be utilized for semi-continuous or continuous bonding and casting of composite metal articles having uniform cross-section, utilizing the described process. The substrate 14 is in the form of a cylindrical bar of low carbon steel which can serve, for example, as the core or hub of a gear. It has a melting point in the range of 2,500° F. The molten casting metal 15 may be a copper casting alloy such as SAE 65 phosphor gear bronze which has a solidus temperature of 1,528° F. and a liquidus temperature of 1,832° F.

The mold 12 is a cylindrical tubular sleeve of suitable material such as graphite or graphite coated metal, which is open at both ends and presents a cylindrical cavity 16 of greater diameter than that of the substrate bar 14. The melting pot or holding pot 13 is disposed closely adjacent to the mold 12 and is brought into flow communication with the cavity 16 by means of a metering valve 17 having a flow passage 18 which can be brought into adjustable registry with a similar passage 19 provided in a guide block 20 which is disposed above the inlet opening of the mold 12. The guide block 20 is dimensioned to guide the rod 14 into the cavity of the mold 12 as well as to provide a passageway, free of oxidizing atmosphere, for the substrate 14 in its transfer movement from the preheat furnace 10 to the mold 12.

Although the mold 12 may, prior to the start of the casting process, contain atmospheric air, it may be purged of this oxidizing atmosphere by infusing it with an inert gas or, alternatively, for the continuous casting process such air will be immediately displaced by the traveling substrate 14 and the continuous flow of casting metal 15 so that after the initiation of the process the metals have served to maintain the cavity 16 free of the oxidizing atmosphere. However, it may be advisable to provide a stream of inert or reducing gas through an injection fitting 21 which is directed around the entrance opening of the mold so as to displace air and prevent or minimize oxidation in that area of the substrate or the exposed casting metal. The flow of the casting metal is controlled to maintain the mold in filled condition as the bar 14 travels downwardly carrying with it the solidified bonded ring of casting metal. In order to minimize the possibility of voids or pockets in the cast article, it is desirable to adjust the flow of the casting metal to a slight excess which will overflow from the entrance opening of the mold and can be subsequently recovered for reuse.

The substrate is preheated to a temperature of approximately 1,100° F. and the casting metal is heated to approximately 1,900° F. The molten metal 15 which is flowed into the cavity 16 comes into intimate contact with the surface of the traveling substrate 14 and serves to elevate its temperature at the interface by approximately 100° F. during the time that the casting metal remains in its molten condition. As previously indicated, this condition will usually be maintained for about one-tenth of a second which suffices for the wetting and bonding action at the interface to go to completion. Thereafter, the heat transfer relationship is such that the casting metal 15 is chilled to solidification at the interface, thus arresting the possibility of any substantial interface alloy formation, and this chilling effect quickly extends outwardly into the mass of the molten casting metal, as well as to some extent inwardly from the wall of the mold 12, until complete shape-retaining solidification of the casting metal occurs as indicated by the reference numeral 15a. The composite metal article continues its travel as to be discharged from the mold 12 after solidification has occured and can thereafter be processed or treated in any desired manner.

Figure 3:
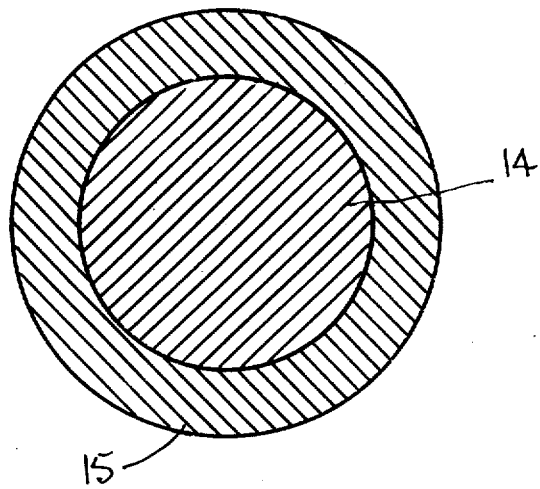
FIG. 3 is a diagrammatic representation of a cross-section of a composite metal gear blank which is representative of the type of article which could be made in the apparatus of FIG. 2.
Figure 4:
FIG. 4 is a photomicrograph of a composite metal article made in accordance with the process of the invention and showing the appearance of the bond at the interface at a magnification of 1,000×. The specimen was metallographically polished and etched with 2 percent Nital.

In the continuously cast composite metal article, it will have a uniform cross-section and can be severed or sawed into disks of appropriate thickness for the formation of gear blanks or the like. A typical cross-section of the product resulting from the process is illustrated in FIG. 3 of the drawings. There is complete molecular bonding and adhesion of the casting metal to the steel core so that a unitary composite article is obtained. The interface has no visually apparent alloy formation and is free of voids or exogenous particles, as will be observed from inspection of the metallographically polished specimen at a magnification of 1,000× shown in the photomicrograph of FIG. 4.

The cast article, having an outside diameter of 2.375 inches with the copper casting alloy deposited on a steel substrate having a diameter of 1.625 inches was subjected to shear tests and tensile tests in an effort to separate the core from the surrounding copper alloy and thus test the effectiveness and soundness of the bond. In both types of tests, no separation occured and failure consistently occured in the copper casting alloy outside the interface. In the tensile tests, the specimens fractured approximately 0.125 inches from the bond. In the shear tests, the specimens parted in the copper alloy approximately 0.07 inches away from the bond at the interface. The shear tests did not effect any separation at the bond. The effectiveness and strength of the bond was thus superior to that of the casting metal which would have been used for the manufacture of the complete article in accordance with prior art techniques.

Another example of a composite metal article produced by the above-described process utilized a stainless steel substrate in the form of a bar containing approximately 17 percent chromium and 9 percent nickel, commonly known as AISI type 302. This substrate has a melting point of 2,500° F. and was preheated to 1,650° F. prior to transfer into the mold. The casting metal was free machining copper containing 1 percent lead, ordinarily known as leaded copper, having a liquidus of 1,976° F. The molten bath was maintained at a temperature of 2,050° F. The resultant composite cast product demonstrated excellent adhesion at the bond interface and had the attributes and advantages previously enumerated for the composite cast product previously described.

Composite cast metal articles of the type herein described can be used for the production of gear blanks, as previously indicated, as well as for other anti-friction elements and members, such as bearings, ways for machine tools, and wear plates for supporting forming die sections.

Having thus described my invention, I claim:

1. The process of bonding two dissimilar bondable metals into a composite unitary metal article, comprising the steps of:
    a. Heating a solid state bondable substrate metal in a non-oxidizing atmosphere to a preheat temperature which is below the melting points of both the substrate and the casting metal,
    b. Disposing the heated substrate in an article-forming mold cavity free of oxidizing atmosphere,
    c. Introducing a molten bondable casting metal into the mold in contact with the substrate to elevate the interface temperature of the substrate to a bonding temperature range which is below the aforesaid melting points,
    d. Maintaining said bonding temperature in said range for a time interval sufficient to complete wetting of the substrate at the interface and molecular adhesion of the casting metal thereto,
    e. Regulating the temperature of said molten casting metal and the preheat temperature of said substrate in relation to their heat capacities and the latent heat of transformation of said casting metal to establish a rate of heat transfer between said metals sufficient to cause solidification of said casting metal at the bond interface after said bonding time interval but before an alloying temperature condition is established at the interface, and
    f. Cooling said casting metal to shape-retaining solidification in said mold.

2. A process as defined in claim 1, including the step of moving said substrate through said mold cavity and discharging said composite article therefrom as said molten casting metal is introduced therein.

3. A process as defined in claim 1, wherein said substrate has a higher melting point than said casting metal.

4. A process as defined in claim 1, wherein said substrate has a lower melting point than said casting metal.

* * * * *